Patented Mar. 31, 1942

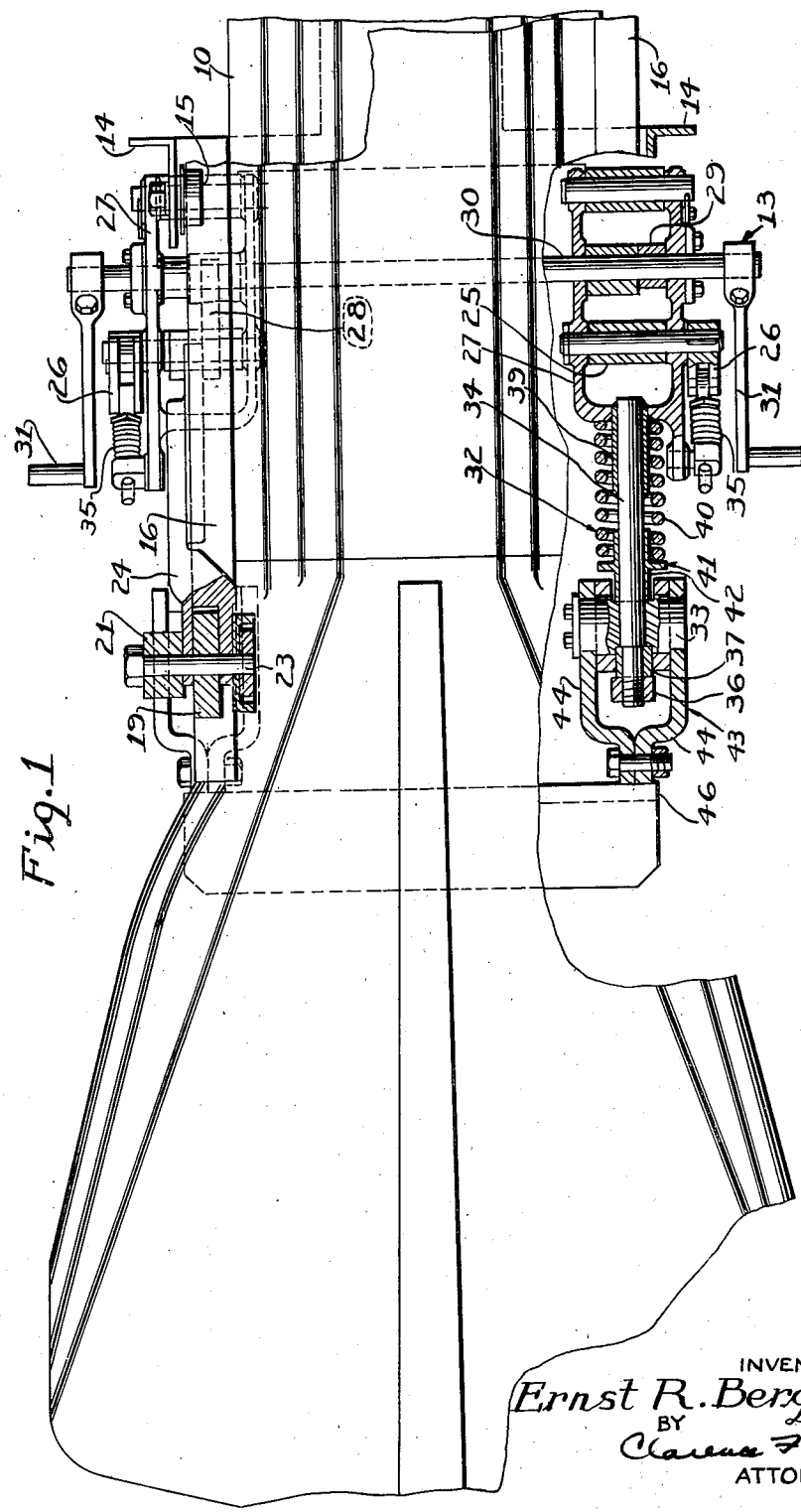

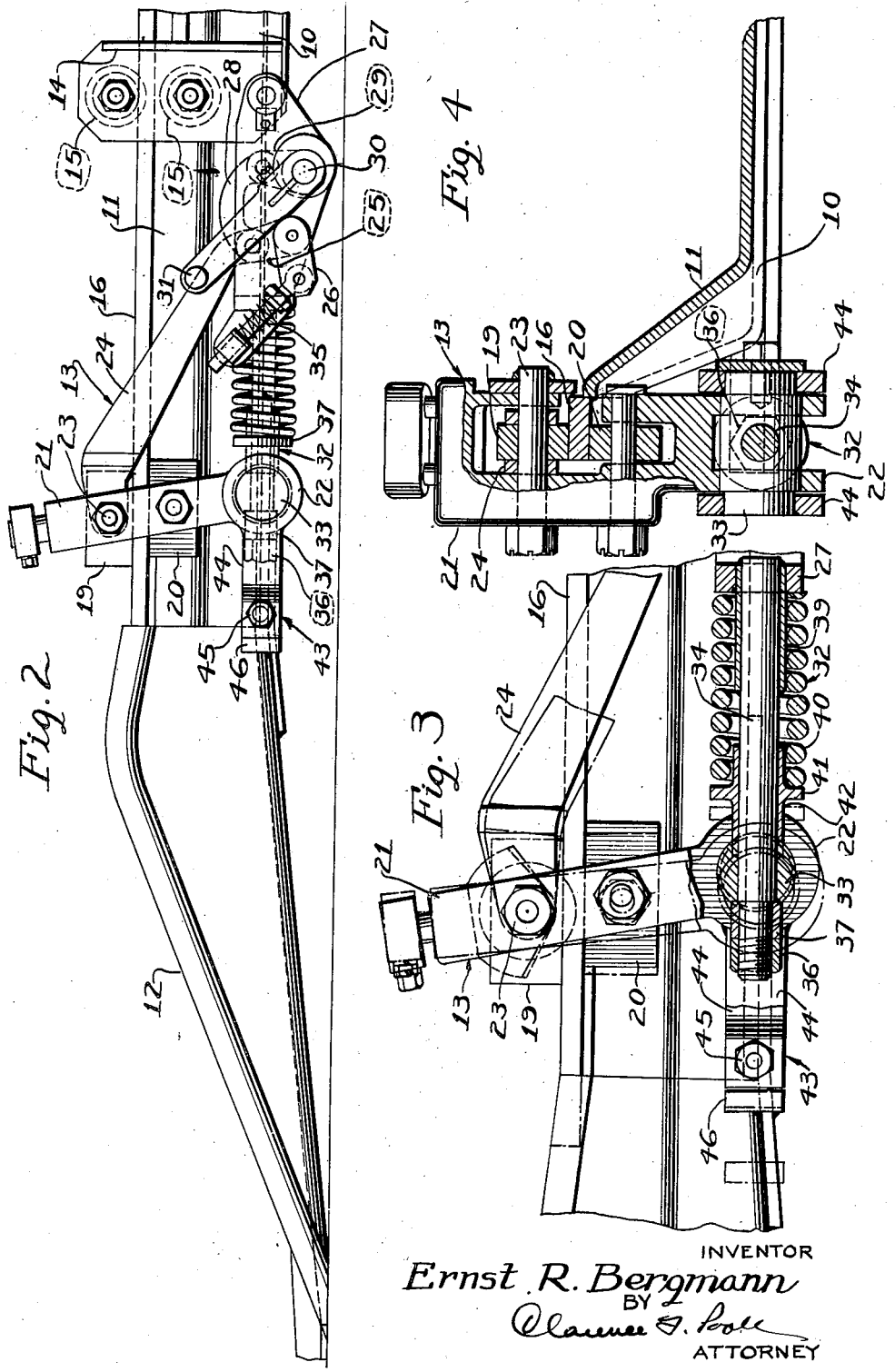

2,278,302

UNITED STATES PATENT OFFICE 2,278,302

FEEDING MECHANISM FOR SHAKER OR JIGGING CONVEYERS

Ernst R. Bergmann, Chicago, Ill., assignor to Goodman Manufacturing Company, Chicago, Ill., a corporation of Illinois Application October 16, 1940, Serial No. 361,375

4 Claims. (Cl. 198—220)

This invention relates to improvements in feeding mechanisms for shaker or jigging conveyers.

More specifically, the present invention is an improvement on the general form of feeding device disclosed in my prior Patent No. 2,186,472.

The principal objects of my invention are to provide a novel form of feeding device for an extensible trough section of a shaker conveyer, of a simpler construction than formerly and arranged so the feeding device itself may yieldably stop retractible movement of the extensible trough section, when it reaches a fully retracted position, to relieve shock loads from the feeding mechanism and prevent breakage of the parts thereof formerly caused by engagement of the extensible trough section with the reciprocating trough section or feeding mechanism.

Other objects of my invention will appear from time to time as the following specification proceeds and with reference to the accompanying drawings wherein:

Figure 1 is a fragmentary plan view of an extensible trough section of a shaker conveyer nested within a reciprocating trough section, illustrating a feeding mechanism constructed in accordance with my invention, with certain parts thereof broken away and certain other parts shown in horizontal section in order to more clearly illustrate certain details of my invention;

Figure 2 is a view in side elevation of the device shown in Figure 1;

Figure 3 is an enlarged fragmentary detail side elevational view of the feeding mechanism, with certain parts thereof shown in longitudinal section; and Figure 4 is an enlarged partial fragmentary transverse sectional view taken through the gripping blocks of the feeding mechanism.

In the embodiment of my invention illustrated in the drawings, a reciprocating trough section 10 of a usual construction is provided. Said trough section is connected to and driven from the forward end of a shaker conveyer trough line (not shown), in the usual manner. An extensible trough section 11, having a shovel 12 on the forward end thereof, is adapted to be telescopically extended or retracted with respect to said reciprocating trough section, by means of feeding mechanism generally indicated by reference character 13. Said feeding mechanism is of the same general type as that illustrated in my prior Patents Nos. 2,154,060 and 2,186,472, so will only herein be described in so far as is necessary to make my present invention readily understandable.

The extensible trough section 11 is supported on a shoe (not shown) at its rear end, and rests on the ground on the bottom of the shovel 12 at its forward end, so that the entire weight of said trough section is directly supported on the ground. The details of said shoe and its connection to said extensible trough section are clearly disclosed in my prior Patent No. 2,154,060 and are no part of my present invention, so are not herein shown or described.

The reciprocating trough section 10 is provided with a supporting and guiding member 14, extending across its bottom and upwardly along opposite sides thereof. Said supporting and guiding member has the feeding mechanism 13 pivotally connected to opposite sides of the lower portion thereof and has spaced apart rollers 15, 15 mounted in the upper portion of opposite vertical sides thereof. Said rollers are adapted to ride along and engage the upper and lower surfaces of bearing plates 16, 16, extending laterally from the upper flanges of said extensible trough section. Said extensible trough section thus forms a supporting means for the forward end of said reciprocating trough section, permitting said reciprocating trough section to slidably move therealong. The feeding mechanism 13 includes two sets of friction grip blocks 19 and 20, each of which sets is mounted in a carrier member 21. Said carrier members are of a substantially C-shaped formation, with a depending lower end portion 22, and with the open part thereof extending inwardly along the respective bearing plate 16. The construction and operation of each gripping device and carrier member and its connection to the support member 14 is similar, so a description of one will suffice for both.

The upper friction grip block 19 is pivotally mounted on a pivotal pin 23, which has the bifurcated ends of a link 24 pivotally connected thereto on opposite sides of said friction grip block. Said link extends rearwardly in a downwardly inclined direction and is pivotally connected at its rear end to a crank 25, mounted in a pivoted supporting bracket 27. Said supporting bracket is pivoted to the forward end of the supporting and guiding member 14 and projects forwardly therefrom. A link 28 is pivotally connected to said crank at its point of connection to the link 24 and has pivotal connection with a crank 29 mounted on a transverse shaft 30. Said shaft is journaled in the pivoted supporting brackets 27, 27 and is provided with hand cranks 31, 31 at its ends, which serve to adjust the position of the carrier members 21, 21 and grip blocks 19 and 20, for extending or retracting the extensible trough section. A crank 26 mounted coaxially with the crank 25 and urged in a downward direction by means of a spring pressed link 35, is provided to hold the carrier member 21 in position, so the grip blocks 19 and 20 will be in a gripping position at the beginning of the forward or return stroke of the conveyer, depending upon the position of said carrier member.

The lower end 22 of the carrier member 21 is pivotally connected to a yieldable link 32, projecting forwardly from the forward end of the bracket 27. As herein shown, said lower end is of a bifurcated formation and has a pivotal pin 33 pivotally mounted thereon. Said pin has a shaft 34 of the link 32 extending therethrough and adapted to be adjusted with respect thereto by means of a nut 36 threaded on the end of said shaft and engaging a collar 37, having its inner portion recessed within said pin for a short portion of its length. The opposite end of said shaft extends through a sleeve 39 and is secured to said sleeve and the forward end of the bracket 27 in a suitable manner, such as welding. A compression spring 40 encircles the sleeve 39 and shaft 34 and is interposed between the forward end of the bracket 27 and a flange 41 of a flanged collar 42. Said spring is of such strength that the link 32 generally acts as a solid member, but will yield upon overload of the carrier member 21 as, for instance, in cases where the forward end of the shovel 12 engages a solid obstruction on the ground, during extension of the extensible trough section.

Referring now in particular to the novel arrangement whereby the spring 40 will yieldably stop retractible movement of the extensible trough section, a yoke 43 projects forwardly from and is mounted on the ends of the pivotal pin 33. Said yoke, as herein shown, consists of a pair of members 44, 44, secured together by a nut and bolt indicated by reference character 45. The outer member 44 of said yoke is herein shown as being secured to the outer end of said pin, so said yoke will project forwardly of said pin and carrier member in a generally horizontal plane, and the forward end thereof will form an abutment for a transversely extending member 46, secured to the underside of the shovel 12, adjacent the rear end thereof.

When the carrier members 21, 21 and the grip blocks 19, 19 and 20, 20 are in the position shown in Figures 1, 2 and 3, yieldable links 32, 32 will engage said grip blocks with the bearing plates 16 upon the return stroke of the conveyer, and will be released from said bearing plates upon the forward stroke of the conveyer, to retract said extensible trough section within said reciprocating trough section, in a manner clearly shown and described in my aforementioned Patents Nos. 2,154,060 and 2,186,472. As said extensible trough section nears the extreme limits of its retractible movement, and upon forward movement of the reciprocating trough section and feeding mechanism, the abutting ends of the yokes 43, 43 will engage opposite ends of the transversely extending abutting member 46, as shown by dotted lines in Figure 3. This will cause the spring 40 to yield and yieldably stop retractible movement of said extensible trough section.

While I have herein shown and described one form in which my invention may be embodied, it will be understood that the construction thereof and the arrangement of the various parts may be altered without departing from the spirit and scope thereof. Furthermore, I do not wish to be construed as limiting my invention to the specific embodiment illustrated, excepting as it may be limited in the appended claims.

I claim as my invention:

1. In a shaker conveyer and in combination with a feeding device therefor, a reciprocating trough section, an extensible trough section, a pair of friction grip blocks adapted to have selective engagement with said extensible trough section during certain strokes of the conveyer, for extending or retracting said extensible trough section with respect to said reciprocating trough section, a carrier member forming a mounting for said grip blocks, a link pivotally connected between said reciprocating trough section and the upper end of said carrier member, a yieldable link pivotally connected between said reciprocating trough section and the lower end of said carrier member, means to position said carrier member to cause said grip blocks to grip said extensible trough section during either the forward or return strokes of the conveyer, to extend or retract said extensible trough section, and a stop on said extensible trough section adapted to engage said yieldable link, to cause said link to form a yieldable stop for said extensible trough section.

2. In a shaker conveyer and in combination with a feeding device therefor, a reciprocating trough section, an extensible trough section, a pair of friction grip blocks adapted to have selective engagement with said extensible trough section during certain strokes of the conveyer, for extending or retracting said extensible trough section with respect to said reciprocating trough section, a carrier member forming a mounting for said grip blocks, a link pivotally connected between said reciprocating trough section and the upper end of said carrier member, a yieldable link pivotally connected between said reciprocating trough section and the lower end of said carrier member, means to position said carrier member to cause said grip blocks to grip said extensible trough section during either the forward or return strokes of the conveyer, to extend or retract said extensible trough section, a stop on said extensible trough section, and means projecting forwardly from said link and adapted to engage said stop to cause said link to form a yieldable stop for said extensible trough section during retractible movement thereof.

3. In a shaker conveyer and in combination with a feeding device therefor, a reciprocating trough section, an extensible trough section, a pair of friction grip blocks adapted to have selective engagement with said extensible trough section during certain strokes of the conveyer, for extending or retracting said extensible trough section with respect to said reciprocating trough section, a carrier member forming a mounting for said grip blocks, a link pivotally connected between said reciprocating trough section and the upper end of said carrier member, a yieldable link pivotally connected between said reciprocating trough section and the lower end of said carrier member, means to position said carrier member to cause said grip blocks to grip said extensible trough section during either the forward or return strokes of the conveyor, to extend or retract said extensible trough section, said yieldable link serving to release said grip blocks from said extensible trough section upon extension thereof and upon the engagement of said extensible trough section with an obstruction, and means on said extensible trough section, adapted to engage said yieldable link, to cause said yieldable link to serve as a yieldable stop for said extensible trough section upon retractible movement thereof.

4. In a shaker conveyer and in combination with a feeding device therefor, a reciprocating trough section, an extensible trough section, a pair of friction grip blocks adapted to have selective engagement with said extensible trough section during certain strokes of the conveyer, for extending or retracting said extensible trough section with respect to said reciprocating trough section, a carrier member forming a mounting for said grip blocks, a link pivotally connected between said reciprocating trough section and the upper end of said carrier member, a yieldable link pivotally connected between said reciprocating trough section and the lower end of said carrier member, means to position said carrier member to cause said grip blocks to grip said extensible trough section during either the forward or return strokes of the conveyer, to extend or retract said extensible trough section, said yieldable link serving to release said grip blocks from said extensible trough section upon extension thereof and upon engagement of said extensible trough section with an obstruction, and means adapted to engage said yieldable link, to cause said yieldable link to serve as a yieldable stop for said extensible trough section upon retractible movement thereof including a member projecting from said link and a stop on said extensible trough section adapted to engage said member.

ERNST R. BERGMANN.